United States Patent [19]
Kathman et al.

[11] Patent Number: 5,153,772
[45] Date of Patent: Oct. 6, 1992

[54] BINARY OPTIC-CORRECTED MULTISTAGE IMAGING SYSTEM

[75] Inventors: Alan D. Kathman; Daniel M. Brown, both of Madison, Ala.

[73] Assignee: Toledyne Industries, Inc., Los Angeles, Calif.

[21] Appl. No.: 682,234

[22] Filed: Apr. 9, 1991

[51] Int. Cl.⁵ .................. G02B 17/00; G02B 27/44
[52] U.S. Cl. .................. 359/364; 359/365; 359/565; 359/741
[58] Field of Search ............ 350/503, 504, 505, 619, 350/620, 1.2, 442, 444, 443, 451, 452, 162.16, 162.17, 3.7, 3.72, 162.2

[56] References Cited

U.S. PATENT DOCUMENTS

| | | | |
|---|---|---|---|
| 1,578,899 | 3/1926 | Lohmann | 350/504 |
| 3,811,749 | 5/1974 | Abel | 350/504 |
| 4,469,414 | 9/1984 | Shafer | 350/444 |
| 4,598,981 | 7/1986 | Hallam et al. | 350/505 |
| 4,685,777 | 8/1987 | Hirose | 350/505 |
| 4,747,678 | 5/1988 | Shafer et al. | 350/442 |
| 4,813,762 | 3/1989 | Leger et al. | 350/162.16 |
| 4,834,517 | 5/1989 | Cook | 350/505 |
| 4,845,790 | 7/1989 | Swanson et al. | 359/569 |
| 4,846,552 | 7/1989 | Veldkamp et al. | 350/162.17 |
| 4,936,665 | 6/1990 | Whitney | 350/451 |
| 4,966,447 | 10/1990 | Huang et al. | 350/452 |
| 5,013,133 | 5/1991 | Burulli et al. | 350/162.11 |

FOREIGN PATENT DOCUMENTS 6377721  12/1978  U.S.S.R. .............................. 350/442

Primary Examiner—Jon W. Henry
Attorney, Agent, or Firm—Beveridge, DeGrandi & Weilacher

[57] ABSTRACT

In accordance with the present invention, a BOE-corrected, off-axis image forming apparatus is disclosed. The apparatus has a first stage with a primary reflective element disposed to reflect light incident from an entrance pupil of the apparatus and form a real image at an intermediate image plane, and a second stage located off-axis with respect to the first stage. The second stage is defined by a secondary reflective and/or refractive assembly which re-images light from the intermediate image plane to a final image plane. A binary optical element (BOE), which has higher-order optical characteristics for providing aspheric correction but extremely low optical power, is provided in one of the stages for correcting aberrations introduced by the other optical elements in the apparatus. The BOE contributes no more than about 3% of the optical power provided by the stage which contains the BOE.

20 Claims, 5 Drawing Sheets

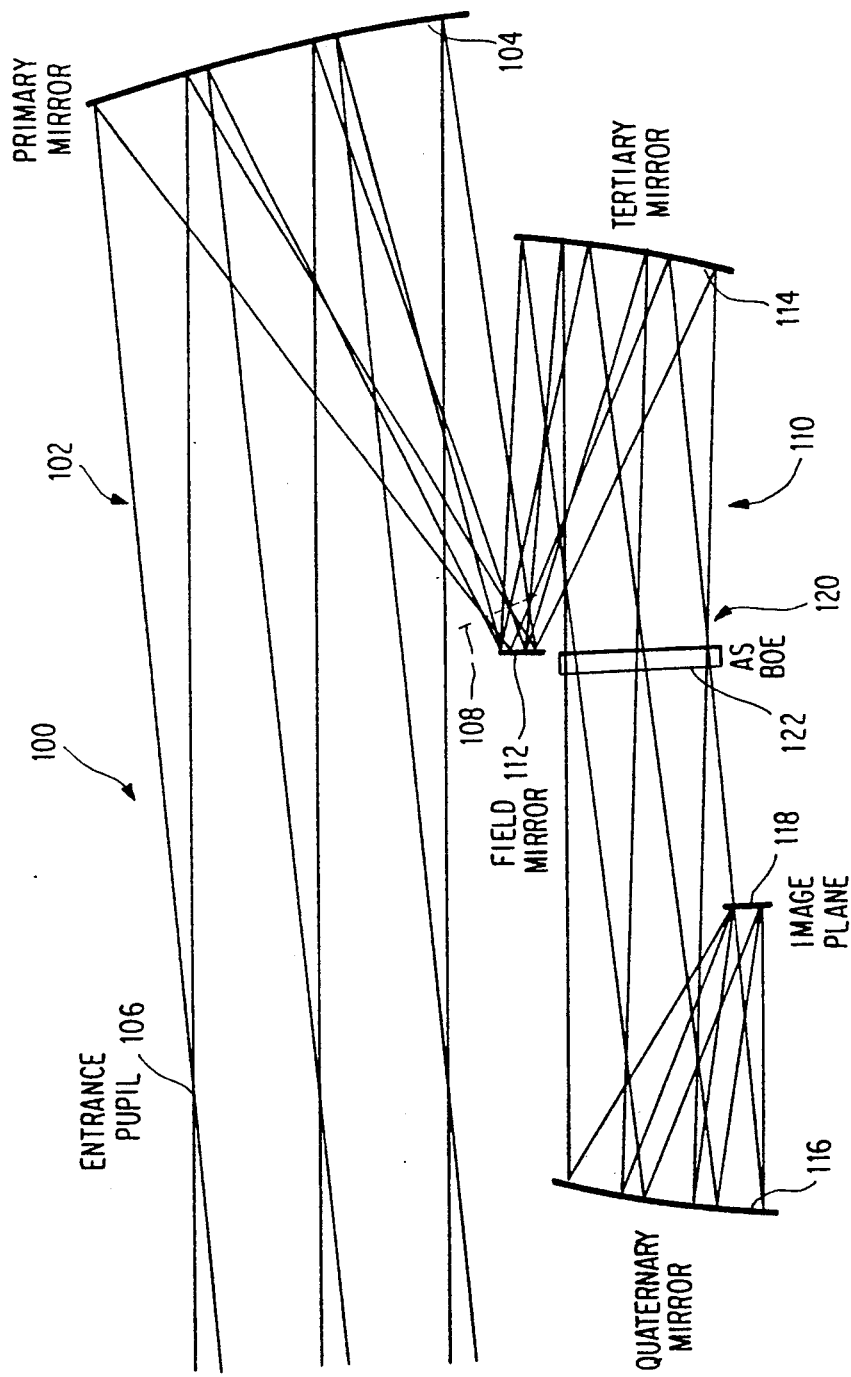

BINARY OPTIC-CORRECTED MULTISTAGE IMAGING SYSTEM

BACKGROUND OF THE INVENTION

The present invention relates to a binary optic-corrected, wideband imaging system incorporating a binary optical element (BOE) which provides aspheric correction for aberrations introduced by spherical optical elements. If the BOE is fabricated after other system elements have been fabricated and tested, it can also provide some correction for fabrication and assembly errors. The BOE allows high resolution, wide field-of-view imaging in a system comprising spherical or flat surfaces.

In high-performance imaging it is desirable for a system to provide high-resolution capability, wide field-of-view (FOV), low f-number, zero obscuration, and wide waveband operation with inexpensive spherical surface elements. Conventional technology achieves such performance from optical systems by incorporating a large number of spherical surface elements and/or several elements having aspheric surfaces. Optical systems implemented with large numbers of relatively heavy spherical surface elements may be found to have distinct size and weight disadvantages.

The size and weight problem often requires the use of aspheric surfaces, However, unlike spherical surfaces which are relatively easy to produce using existing optical fabrication technologies, the fabrication of aspheric surface elements requires a labor intensive, iterative polish and test manufacturing process. Thus, the cost of producing aspheric surface elements often is prohibitive. Also, machining difficulties generally limit aspheres to sections of rotationally symmetric conic surfaces.

Binary optical elements (BOEs) have been substituted for conventional optical elements in prior inventions. For instance, U.S. Pat. No. 4,846,552 discusses that BOEs fabricated by a process disclosed therein can be used for a binary grating telescope. In the arrangement of U.S. Pat. No. 4,846,552, two BOEs are present in place of conventional elements. Both BOEs are of the two-level grating type and each have substantial optical power (finite focal lengths). The patentee shows an off-axis telescope and suggests that the telescope is directed for use in optical laser radar systems. While the arrangements of U.S. Pat. No. 4,846,552 is suitable for narrow band laser systems, it would not likely provide the desired performance in a broadband incoherent imaging system as the BOEs have optical power.

An achromatic imaging system is disclosed in U.S. Pat. No. 4,550,973. In the system of U.S. Pat. No. 4,550,973, a diffractive hologram is positioned as the primary element. In order to achieve a broad wavelength passband, two holographic optical elements are provided with a lens therebetween. The first holographic optical element has positive optical power and the second holographic element has a negative optical power in order to cancel chromatic aberration introduced by the first holographic element.

SUMMARY OF THE INVENTION

The present invention is a binary optic-corrected, off-axis, multistage imaging system arranged to provide high resolution across a large FOV without obscuration. An optical configuration in accordance with the present invention provides the desired high resolution and large FOV with better fabrication control, with lower weight and at lower cost. A BOE enhances the performance of conventional spherical optical elements. In accordance with the invention, the BOE has primarily higher-order optical characteristics for aspheric wavefront correction. It has insubstantial optical power and thus substantially infinite focal length. As such, the BOE improves system performance by providing aspheric correction and thus obviates more expensive aspheric optics.

The preferred embodiments of the imaging system according to the invention include only spherical reflecting or refracting surfaces and the BOE which compensates for aberrations introduced by the spherical surface elements. As the BOE has very low optical power, the BOE introduces minimal chromatic aberration and thus allows a wider waveband of operation. In the preferred embodiments, the imaging system is arranged to have at least two stages. Each such stage generally has optical power, but the BOE accounts for no more than about 3% of the optical power of the stage which includes the BOE. Unlike imaging systems which utilize BOEs or other diffractive elements that have positive or negative optical powers and which are thereby limited to narrow bandwidths, the system of the present invention is suitable for broadband, incoherent imaging.

Further, in the preferred embodiments, the stages are arranged off-axis. The off-axis configuration avoids obscurations. It also avoids positioning a diffractive element at the first surface within the optical system. Rather, the BOE preferably is placed near an interior pupil plane to correct pupil-dependent aberrations such as spherical aberration. It will be apparent that the BOE can be shifted with respect to the interior pupil plane, toward the image plane, so as to compensate for additional field-dependent aberrations. Optimal positioning of the BOE within the system is dependent upon the extent of pupil-dependent and field-dependent aberrations present within a particular system. The BOE can be fabricated on a flat or a curved surface. Hence, the BOE can be provided on a lens or on a mirror surface. The BOE simulates any arbitrary surface and it is for this reason that the BOE can significantly reduce non-symmetric aberrations present in a tilted and decentered off-axis optical imaging system such as a high-resolution telescope.

In summary a binary optic-corrected imaging apparatus in accordance with the present invention comprises: a first stage which includes a primary reflective member disposed to reflect light incident from an entrance pupil plane and to form an off-axis real image plane; a second stage which is located off-axis with respect to the first stage and which includes a secondary reflective member disposed to direct light reflected from the primary reflective member toward another image plane; and a binary optical element (BOE) located in a path of light through one of the stages for providing substantially only aspheric correction of aberrations in the apparatus.

An alternative embodiment of a binary-optics corrected optical system according to the present invention has image forming capability with incoherent light and such system comprises: optical means which includes optical elements arranged in a plural stage configuration to provide the system with a large bandwidth, and a wide field-of-view, the optical elements including a spherical surface element; and a binary optical element (BOE) disposed in the path of light through one of the stages for providing substantially only aspheric correction therein for residual aberrations introduced by the spherical surface element.

BRIEF DESCRIPTION OF DRAWINGS

Further aspects and features of the present invention will be even more apparent from the following detailed descriptions and drawings, and the appended claims. In the drawings:

FIG. 4 is a schematic diagram of an alternative embodiment of the imaging system in accordance with the present invention, based upon a classic Schmidt camera arrangement;

DETAILED DESCRIPTION OF THE PREFERRED EMBODIMENTS

Figure 1:
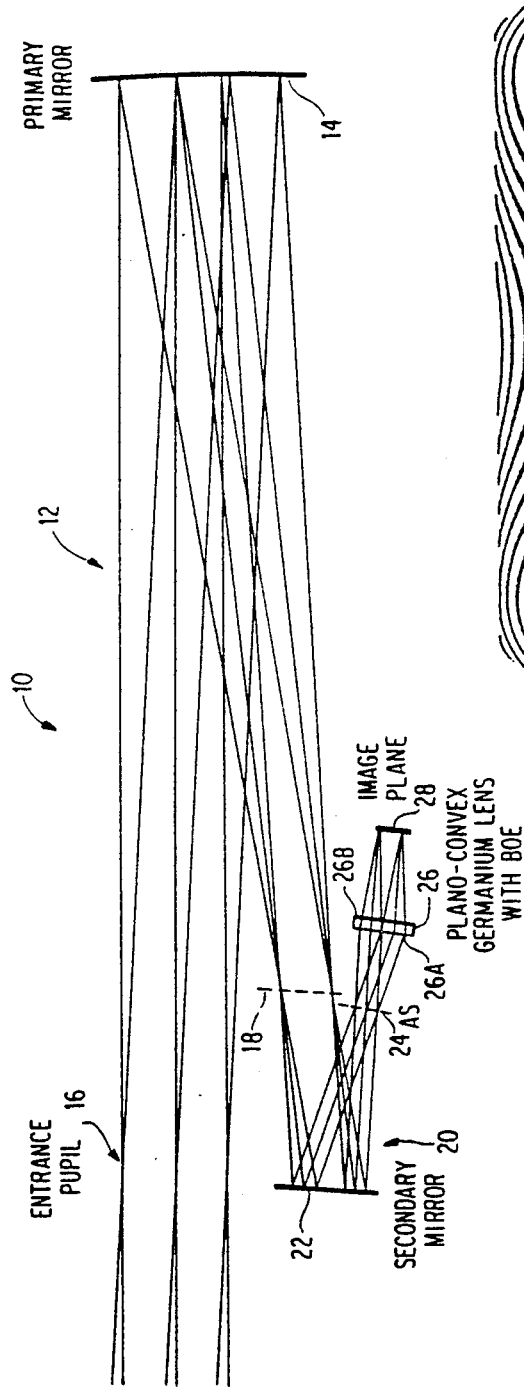
FIG. 1 is a schematic diagram of a preferred embodiment of a binary optic-corrected, off-axis, multistage imaging system according to the present invention.

In FIG. 1, there is shown a BOE corrected, multistage image system 10 in accordance with the present invention. System 10 provides a high-resolution, wide field of view (wide-FOV) imaging apparatus. System 10 of FIG. 1 comprises an off-axis configuration and has two stages. A first stage 12 is provided by the system entrance pupil 16, primary mirror surface 14, and an intermediate image plane 18. A second stage 20 is located off-axis with respect to the first stage 12, and has a secondary mirror 22, the aperture stop 24, a combined lens and BOE element 26, and a final image plane 28. The combined lens and binary optical element (BOE) 26 forms a real image at the final image plane 28.

In FIG. 1, the lens-BOE element 26 is shown as disposed in a plane which is generally perpendicular to the path of light between the aperture stop 24 and the image plane 28. Element 26 comprises a lens portion 26A and a BOE portion 26B. Lens portion 26A comprises a germanium plano-convex lens and has a focal length to define the image plane 28 at a desired location. The BOE portion 26B of element 26 has only insubstantial optical power. In the preferred embodiments, the BOE performs only minimal, higher-order aspheric correction of a wavefront incident on lens-BOE element 26. Thus, BOE portion 26B is understood to only slightly bend the wavefront, as necessary, to form a substantially perfect spherical wavefront. As is appreciated, the BOE portion 26B can be located on either side of element 26, namely on the side facing aperture stop 24 or the side facing image plane 28 without significantly affecting the operation of system 10.

In accordance with the present invention, spherical mirror surfaces 14 and 22, and lens portion 26A provide substantially all the optical power and the first-order imaging properties. The second stage 20 has a measurable optical power due to mirror surface 22 and lens portion 26A. In the preferred embodiments, no more than about 3% of the total optical power attributed to the second stage 20 is provided by the BOE portion 26B. More preferably, the BOE portion provides no more than about 1.25% of the second stage optical power. Rather, BOE portion 26B provides substantially only aspheric correction for the spherical surface elements. In the embodiment of FIG. 1, and indeed in all preferred embodiments, the mirror and lens surfaces need only have spherical configurations because the BOE provides the aspheric phase addition to substantially correct both pupil-dependent and field-dependent aberrations introduced by the spherical surfaces. The BOE of element 26 while usually fabricated on a flat or a spherical surface, can simulate any arbitrary surface, including nonsymmetric "saddle-shape" surfaces. As such, it is contemplated that in fabrication of the BOE portion 26B corrections can be made for non-symmetric aberrations. Hence, due to the very low optical power of BOE portion 26B, the bandwidth of system 10 is not limited by the BOE so that the system may have broadband imaging capability with incoherent light.

Lens-BOE element 26 is positioned near the interior pupil plane, i.e. aperture stop 24, to correct pupil-dependent aberrations. At its location near the interior pupil plane, element 26 is well protected from the external environment near the entrance pupil 16. Also, due to its location, lens-BOE element 26 can be made to have virtually any size convenient for fabrication, independent of the size of the entrance pupil 16 or of the size of the image plane 28. It is contemplated that lens-BOE element 26 could be shifted toward the image plane 28 in order to provide greater compensation for field-dependent aberrations. Thus, it is understood that for any given system, the BOE can be positioned with respect to the aperture stop and image plane to optimally compensate for pupil-dependent and field-dependent aberrations. On the other hand, minor adjustments in the degree of tilting and decentering of mirror surfaces 14 and 22 as well as other optical elements can be made to balance aberrations. It also is contemplated that system 10 would be substantially free of chromatic aberrations attributable to BOE portion 26B when the BOE has very low optical power. Image system 10, thus equipped with lens-BOE element 26 is nearly diffraction limited, has a low f-number, and has a wide FOV. In this way, lens-BOE element 26 and spherical mirror surfaces 14 and 22 effectively replace the plurality of off-axis aspheric mirrors necessary to provide nearly perfect spherical waves in systems yielding similar performance. Preferably, lens-BOE element 26 would be fabricated after the mirror surfaces 14 and 22 have been fabricated and tested in system 10 so as to correct fabrication and assembly errors in the mirror surfaces 14 and 22 as well as other optical components.

Figure 2A:
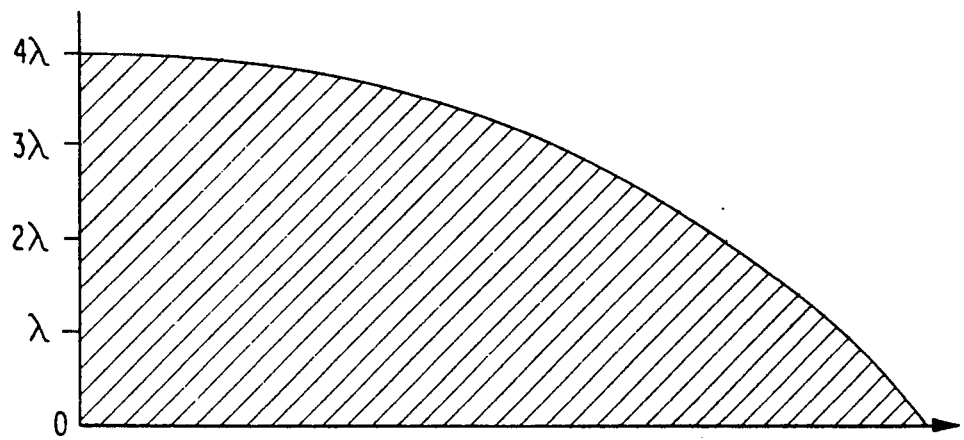
FIG. 2(a) is a graphical depiction of the aspheric phase addition of a conventional aspheric lens.
Figure 2B:
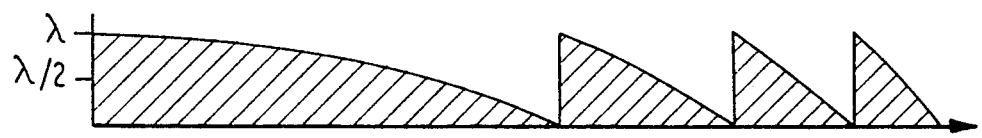
FIG. 2(b) is graphical depiction of the phase profile of a kinoform lens which produces the same effect as 2(a)
Figure 2C:
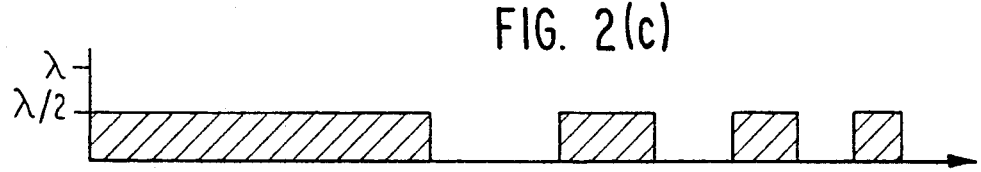
FIG. 2(c) is a graphical representation of the phase profile of a two-level BOE simulating the kinoform of FIG. 2(b)
Figure 2D:
FIG. 2(d) is a graphical representation of the phase profile of a four-level BOE simulating the kinoform of FIG. 2(b)
Figure 2E:
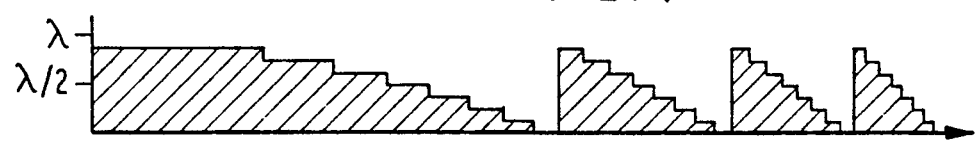
FIG. 2(e) is graphical representation of the phase profile of an eight-level BOE simulating the kinoform of FIG. 2(b)

Preferably, the fabricated BOE portion 26B of element 26 comprises a multi-level grating with more than two levels. Most preferably, the grating forming the BOE comprises sixteen or more levels. FIGS. 2(a) through (e) illustrate the aspheric phase retardance of a conventional aspheric lens, a kinoform lens, and three different BOEs. FIG. 2(a) shows an arbitrary phase profile representing the aspheric correction required of a conventional lens. FIG. 2(b) shows the phase profile of a kinoform lens that will perform the same correction as shown in FIG. 2(a). FIGS. 2(c), 2(d), and 2(e) are BOEs of increasing efficiency which simulate the kinoform of 2(b). The two-level BOE of (FIG. 2(c)) is least efficient because it is a relatively poor approximation to the kinoform and diffracts a significant portion of the light into undesired directions. A closer approximation is seen to be given by a four-level or double etch BOE as depicted in the phase profile diagram of FIG. 2(d). An eight-level or triple etch BOE provides a phase profile depicted in FIG. 2(e) which even more closely approximates that of the kinoform lens profile of FIG. 2(b). A sixteen-level BOE has a 98% diffraction efficiency and an eight-level BOE provides about 94% efficiency as compared to a four-level BOE which has an expected efficiency of about 80%.

Figure 3:
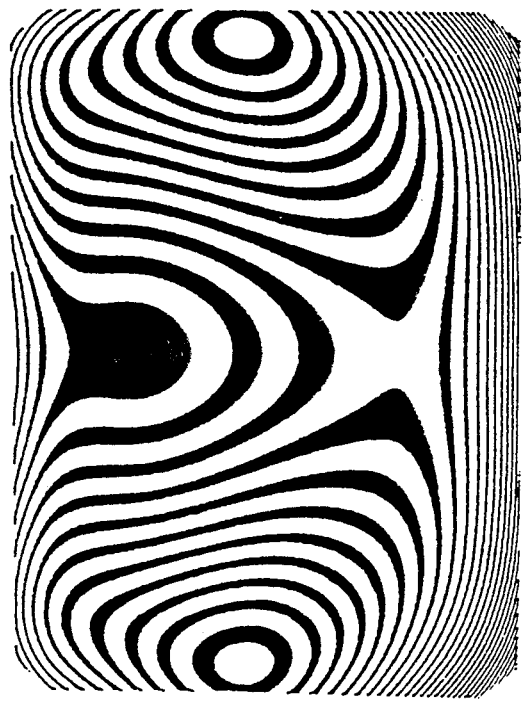
FIG. 3 depicts a typical etching mask employed in the fabrication of a BOE for use in the embodiment of FIG. 1.

In FIG. 3, there is illustrated the pattern of a typical first level etching mask for use in fabricating a BOE suitable for the imaging system 10 of FIG. 1. FIG. 3 illustrates the flexibility and arbitrary wavefront shaping capability of etched BOEs. Fabricating a conventional lens with a phase profile similar to that indicated by FIG. 3 would be nearly impossible. Of course the exact pattern of the mask and resulting grating structure in the BOE is dependent upon the type and extent of aberrations introduced by the spherical and other optical elements present in the imaging system.

An alternative embodiment of a BOE-corrected imaging system according to the present invention is system 100 shown in FIG. 4. System 100 likewise comprises a first stage 102 defined by primary mirror surface 104, the system entrance pupil 106, and intermediate image plane 108. Primary mirror surface 104 likewise is tilted to reflect incoming light to an off-axis field mirror 112. Second stage 110 includes the field mirror 112, a tertiary mirror 114, a BOE 122, a quaternary mirror 116, and an image plane 118. Field mirror 112 directs light from primary mirror surface 104 to the tertiary mirror surface 114. Tertiary mirror surface 114 is aligned with the tilted quaternary mirror surface 116. Quaternary mirror surface 116 in turn reflects light from tertiary mirror surface 114 off-axis to the image plane 118.

In the embodiment of FIG. 4, the entrance pupil 106 preferably is located near the center of curvature of primary mirror surface 104. Field Mirror 112 is located near the field stop of system 100 and thus limits the FOV to reduce stray light. Light reflected by the field mirror 112 is recollimated by tertiary mirror surface 114. The BOE 122 is located near interior pupil plane or aperture stop 120 and provides the aspheric correction for system 100. As in system 10 of FIG. 1, BOE 122 preferably comprises an eight (or more) level grating for high efficiency. Likewise BOE 122 preferably contributes no more than about 3% of the optical power provided by second stage 110, and more preferably, no more than about 1.25%. It also is contemplated that, as in the embodiment of FIG. 1, BOE 122 can be implemented as a lens-BOE element.

As mentioned in the foregoing, in all of the disclosed embodiments, it is contemplated that the BOE can be shifted with respect to the aperture stop of the system. For instance, in the embodiments of FIGS 4 and 5, depending on the extent of pupil-dependent versus field-dependent aberrations, the BOE could be shifted toward the quaternary mirror surface and away from the aperture stop. Alternatively, the BOE can be shifted away from the aperture stop and toward the tertiary mirror surface. Further still, the BOE could remain in the position shown in FIGS. 4 and 5 while the aperture stop is shifted toward either the quaternary mirror surface or the tertiary mirror surface.

Figure 5:
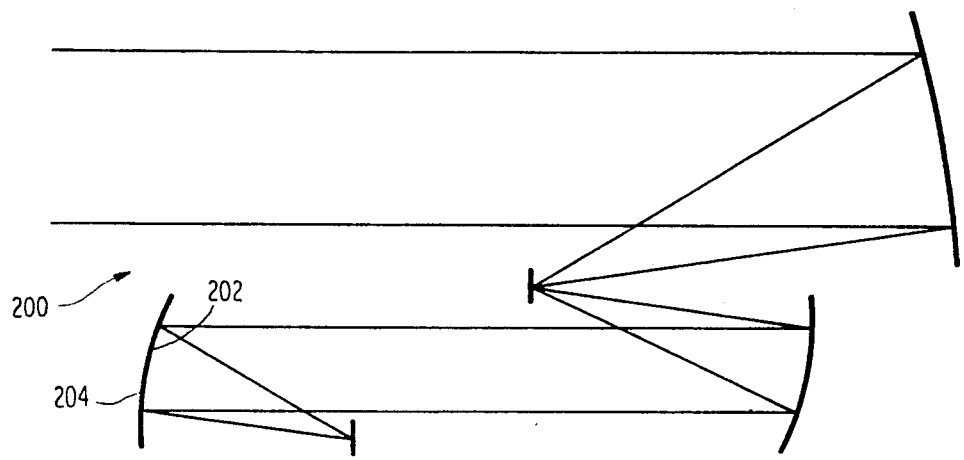
FIG. 5 is a schematic diagram of still another embodiment of the system of the present invention wherein a BOE is formed on one of the spherical mirror surfaces.

An extensive shift in the position of the BOE is shown in the embodiment of FIG. 5. In FIG. 5, an imaging system 200 is provided with a BOE 202 formed on the quaternary mirror surface 204. BOE 202 has a generally spherical surface matching that of the quaternary mirror surface 204. Otherwise, the embodiment of FIG. 5 essentially is the same as the embodiment of FIG. 4.

Figure 6:
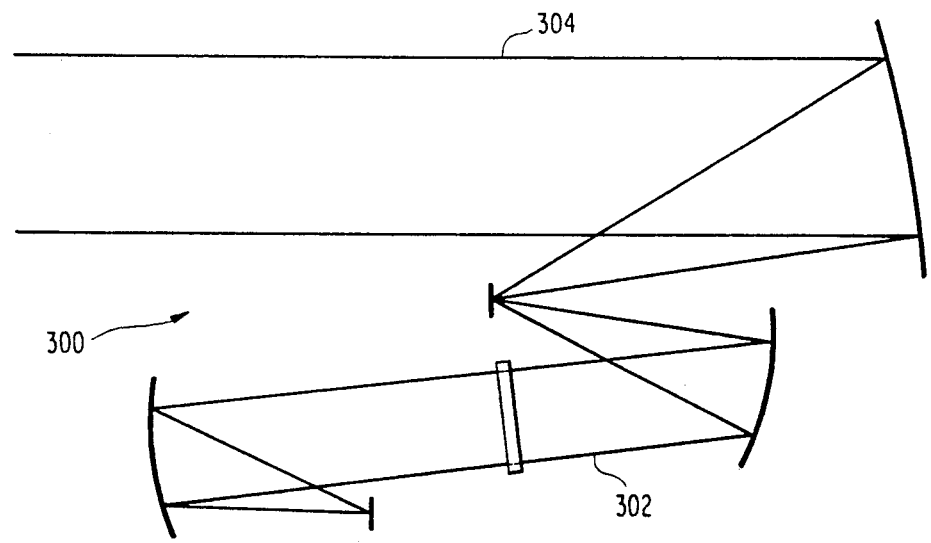
FIG. 6 is a schematic diagram of another embodiment of the imaging system, similar to the embodiment of FIG. 4, wherein the second stage is tilted.

Still further embodiments are contemplated in accordance with the present invention. As shown in FIG. 6, the second stage 302 of system 300 is tilted with respect to the system's first stage 304. Otherwise, the embodiment of FIG. 6 likewise is similar to that of FIG. 4.

Figure 7:
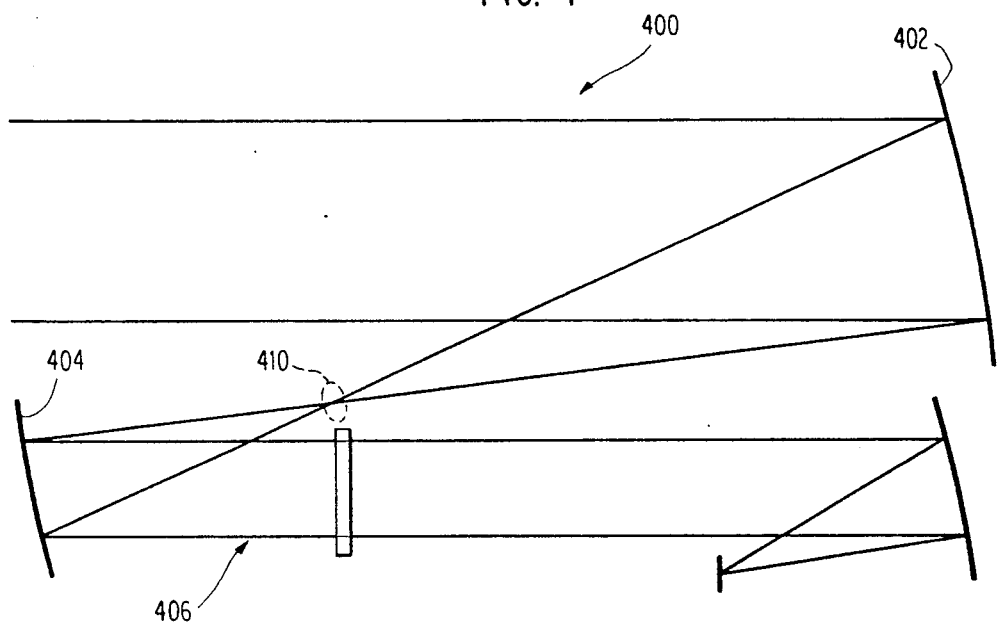
FIG. 7 is a schematic diagram of yet another embodiment of a Schmidt camera type arrangement in accordance with the present invention wherein the field mirror is omitted.

FIG. 7 shows another embodiment in which the field mirror is omitted. The primary mirror 402 of system 400 is tilted to reflect light directly to a secondary mirror 404 of the second stage 406. If desired, as shown in dash lines, a lens 410 could be positioned at the intermediate image plane to increase the field-of-view.

Figure 8:
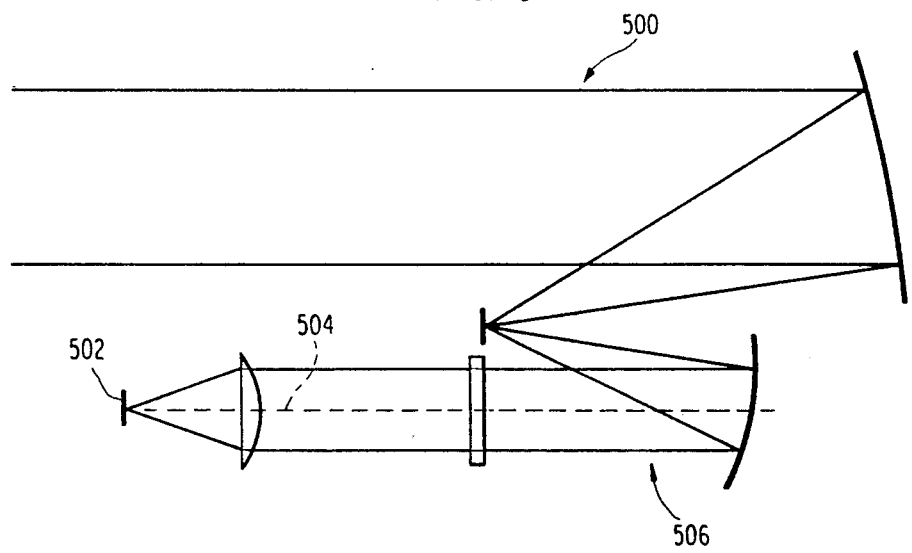
FIG. 8 is a schematic diagram of a still further embodiment in accordance with the present invention.

Imaging system 500 shown in FIG. 8 substitutes a lens for the quaternary mirror surface. Accordingly, in system 500, aberrations introduced by a tilted quaternary mirror are removed.

It is to be understood that there can be various changes and modifications to the preferred embodiments of the present invention disclosed herein, which changes, and/or modifications may be made by one of ordinary skill in the art, but such would still result in a system well within the scope of the invention as set forth in the claims.

What is claimed is:

1. A binary optic-corrected image forming apparatus comprising:

a first stage which includes a primary reflective member disposed to reflect light incident from an entrance pupil plane and to form an off-axis real image plane;

a second stage which is located off-axis with respect to the first stage and which includes a second reflective member disposed to direct light reflected from the primary reflective member toward another image plane; and a binary optical element (BOE) located in a path of light through one of the stages for providing substantially only aspheric correction of aberrations, including non-symmetric aberrations, in the apparatus whereby said apparatus has broadband imaging capability.

2. A corrected image forming apparatus as claimed in claim 1, wherein the stage with the BOE therein has an optical power and wherein the BOE provides no more than about 3% of the optical power of said stage.

3. A corrected image forming apparatus as claimed in claim 2, wherein the BOE provides no more than about 1.25% of the optical power of said stage.

4. A corrected image forming apparatus as claimed in claim 1, wherein the BOE comprises a grating structure having more than two levels.

5. A corrected image forming apparatus as claimed in claim 4, wherein the BOE comprises a sixteen-level grating structure.

6. A corrected image forming apparatus as claimed in claim 1, wherein the primary reflective member comprises a spherical mirror surface.

7. A corrected image forming apparatus as claimed in claim 6, wherein each of the reflective members comprises a spherical mirror surface and wherein the second stage comprises lens means located in the path of light reflected by the secondary reflective member, the BOE being disposed on the lens means.

8. A corrected image forming apparatus as claimed in claim 1, wherein the BOE is disposed on a reflective optical element of the second stage.

9. A corrected image forming apparatus as claimed in claim 1, wherein the BOE and the aperture stop of the apparatus are located in the second stage and between the secondary reflective member and the image plane.

10. A corrected image forming apparatus as claimed in claim 9, wherein the second stage comprises a tertiary reflective member and a quaternary reflective member, the image plane being off-axis with respect to the second stage.

11. A corrected image forming apparatus as claimed in claim 10, wherein the secondary reflective member comprises a field mirror disposed to direct light reflected by the primary reflective member to the tertiary reflective member.

12. A corrected imaging forming apparatus as claimed in claim 11, wherein the second stage further includes a lens disposed to an optical path between the primary reflective member and one of the tertiary or the quaternary reflective members.

13. A corrected image forming apparatus as claimed in claim 10, wherein the BOE is provided on a lens surface between the tertiary and quaternary reflective member.

14. A binary-optics corrected optical system having image forming capability with incoherent light, said system comprising:

optical means which includes optical elements arranged in a plural stage configuration to provide the system with a large bandwidth, and a wide field-of-view, the optical elements including a spherical surface element; and a binary optical element (BOE) disposed in the path of light through one of the stages for providing substantially only aspheric correction therein for residual aberrations, including non-symmetric aberrations, introduced by the optical elements of the optical means.

15. A binary-optics corrected optical system as claimed in claim 14, wherein the stage with the BOE therein has an optical power, and wherein the BOE provides no more than about 3% of the optical power of said stage.

16. A binary-optics corrected optical system as claimed in claim 15, wherein the BOE provides no more than about 1.25% of the optical power of said stage.

17. A binary-optics corrected optical system as claimed in claim 14, wherein the BOE comprises a grating structure having more than two levels.

18. A binary-optics corrected optical system as claimed in claim 17, wherein the BOE comprises a sixteen-level grating structure.

19. A binary-optics corrected optical system as claimed in claim 14, wherein the system comprises a first stage and a second stage located off-axis with respect to the first stage, wherein the BOE is located in the second stage, and wherein the second stage includes means for directing light through the BOE to an image plane.

20. A binary-optics corrected optical system as claimed in claim 19, wherein the optical means comprises a spherical surface primary reflective member in the first stage, wherein the primary reflective member cooperates with the means in the second stage to define the aperture stop in the second stage, and wherein the BOE is located between the aperture stop and the image plane.

* * * * *